US008755929B2

(12) United States Patent
McKernan et al.

(10) Patent No.: US 8,755,929 B2
(45) Date of Patent: Jun. 17, 2014

(54) INTERACTIVE CLAMP FORCE CONTROL SYSTEM FOR LOAD HANDLING CLAMPS

(71) Applicant: Cascade Corporation, Portland, OR (US)

(72) Inventors: Pat S. McKernan, Portland, OR (US); Gregory A. Nagle, Portland, OR (US)

(73) Assignee: Cascade Corporation, Portland, OR (US)

( * ) Notice: Subject to any disclaimer, the term of this patent is extended or adjusted under 35 U.S.C. 154(b) by 53 days.

(21) Appl. No.: 13/663,298

(22) Filed: Oct. 29, 2012

(65) Prior Publication Data

US 2014/0121823 A1 May 1, 2014

(51) Int. Cl.
*G06F 7/00* (2006.01)
*G05B 19/04* (2006.01)

(52) U.S. Cl.
USPC ........... 700/213; 700/228; 700/245; 700/250; 700/258

(58) Field of Classification Search
None
See application file for complete search history.

(56) References Cited

U.S. PATENT DOCUMENTS

| | | | | |
|---|---|---|---|---|
| 4,423,998 | A | 1/1984 | Inaba et al. | |
| 4,511,974 | A | 4/1985 | Nakane et al. | |
| 4,714,399 | A | 12/1987 | Olson | |
| 4,726,729 | A | 2/1988 | Olson et al. | |
| 4,832,341 | A | 5/1989 | Muller et al. | |
| 5,330,168 | A | 7/1994 | Enomoto et al. | |
| 5,335,955 | A | 8/1994 | Pekka et al. | |
| 5,516,255 | A | 5/1996 | Tygard | |
| 5,604,715 | A | 2/1997 | Aman et al. | |
| 5,706,408 | A | 1/1998 | Pryor | |
| 5,984,617 | A | 11/1999 | Seaberg | |
| 6,013,211 | A * | 1/2000 | Seki | 264/40.5 |
| 6,332,098 | B2 | 12/2001 | Ross et al. | |
| 6,439,826 | B1 | 8/2002 | Jordan et al. | |
| 7,121,457 | B2 | 10/2006 | Michal, III | |
| 7,151,979 | B2 | 12/2006 | Andersen et al. | |
| 8,078,315 | B2 * | 12/2011 | McKernan et al. | 700/228 |

(Continued)

FOREIGN PATENT DOCUMENTS

| | | | |
|---|---|---|---|
| DE | 3801133 | A1 | 7/1989 |
| DE | 4433050 | A1 | 3/1996 |

(Continued)

OTHER PUBLICATIONS

PCT International Search Report, PCT/US2009/002127, Dec. 11, 2009, 4 pages, Cascade Corporation, Portland, OR.

PCT International Search Report, PCT/US2013/048400, Sep. 25, 2013, 11 pages, Cascade Corporation, Portland, OR.

*Primary Examiner* — Yolanda Cumbess
(74) *Attorney, Agent, or Firm* — Chernoff Vilhauer McClung & Stenzel, LLP

(57) ABSTRACT

Improvements are disclosed for a load-clamping system with variable clamping force control by which a wide variety of different load types in a wide variety of different load geometric configurations can be accurately clamped at respective variable optimal clamping force settings dependent on each load's respective load type and geometric configuration in combination. An operator display and input terminal cooperates with a controller to translate assortments of possible load variables into a form easily discernible visually by a clamp operator and preferably easily comparable by the operator, from his visual observation, to each particular load which he is about to engage, so that the operator can interactively guide the controller in its selection of an optimal clamping force setting for each particular load.

11 Claims, 6 Drawing Sheets

(56) References Cited

U.S. PATENT DOCUMENTS

| | | | |
|---|---|---|---|
| 2001/0039464 | A1 | 11/2001 | Hackauf |
| 2003/0233184 | A1 | 12/2003 | Roncari |
| 2004/0102870 | A1 | 5/2004 | Andersen et al. |
| 2006/0115354 | A1 | 6/2006 | Prentice et al. |
| 2009/0059004 | A1 | 3/2009 | Bochicchio |
| 2009/0174538 | A1 | 7/2009 | Shibata et al. |
| 2009/0281655 | A1 | 11/2009 | McKernan et al. |
| 2011/0137489 | A1 | 6/2011 | Gilleland et al. |

FOREIGN PATENT DOCUMENTS

| | | | |
|---|---|---|---|
| DE | 19964034 | A1 | 7/2001 |
| DE | 10005220 | A1 | 8/2001 |
| EP | 0995557 | A2 | 4/2000 |
| EP | 1371601 | A2 | 12/2003 |
| EP | 1408001 | A1 | 4/2004 |
| WO | 9200913 | | 1/1992 |
| WO | 2008040853 | A1 | 4/2008 |

* cited by examiner

INTERACTIVE CLAMP FORCE CONTROL SYSTEM FOR LOAD HANDLING CLAMPS

BACKGROUND OF THE INVENTION

This disclosure relates to improvements in a load-clamping system with variable clamping force control by which a wide variety of different load types in a wide variety of different load geometric configurations can be accurately clamped at respective variable optimal clamping force settings automatically dependent on each load's respective load type and geometric configuration in combination.

A prior clamping system shown in U.S. Patent application publication No. 2009/0281655A1, published Nov. 12, 2009 and resulting in U.S. Pat. No. 8,078,315, provides automatic variable maximum clamping force control in response to sensors which determine both the individual load type and load geometric configuration information for each different load. However a significant problem with this highly automatic prior system has been the practical difficulty encountered by load handling facilities in establishing a current database of information necessary to enable the system to operate effectively for a wide variety of load types and geometric configurations encountered in such facilities. The costs and complexities associated with accurately developing, storing, maintaining, matching and communicating the load type, geometric configuration, and optimal clamping force information necessary for the prior system to function adequately in such load handling operations has created difficult challenges. However, the alternative of permitting the operator to control the clamping force levels creates other significant problems, often due to the operator's normal tendency to overclamp the loads and thereby damage either the loads or their packaging or both.

DETAILED DESCRIPTION OF EMBODIMENTS

Figure 1:
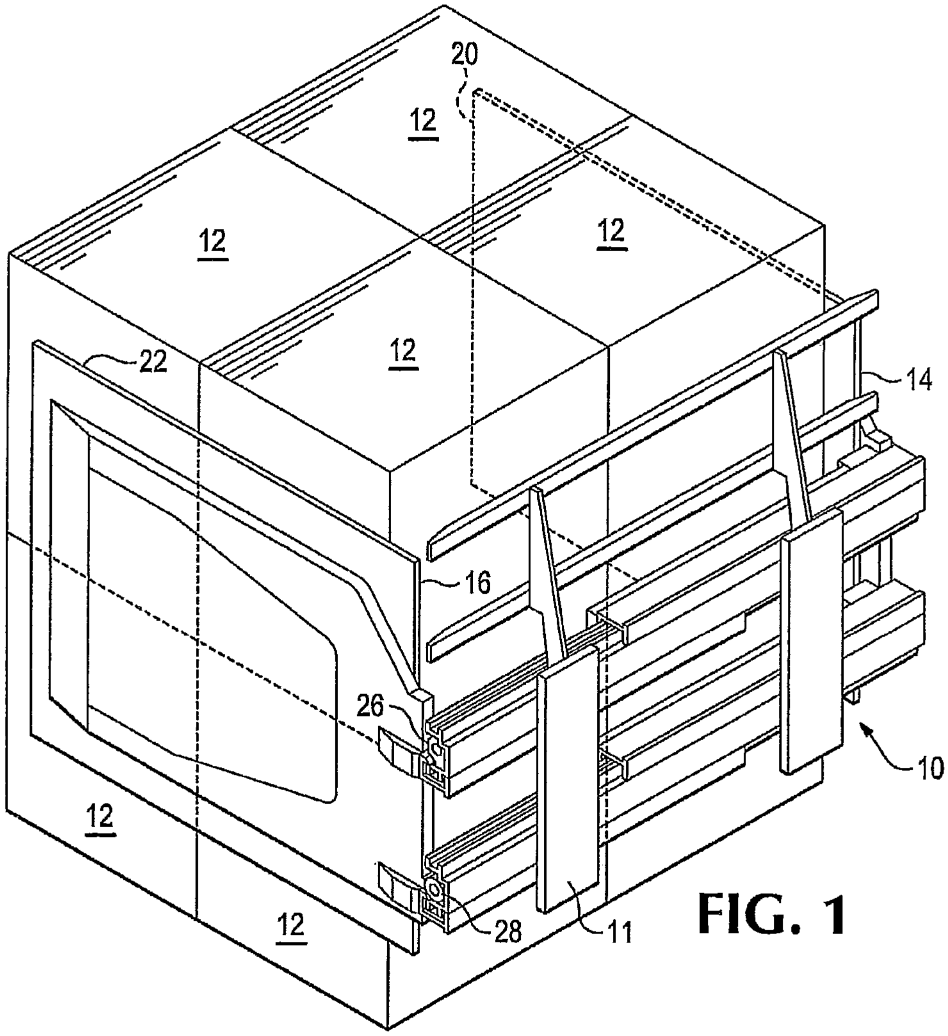
FIG. 1 is a perspective view of an exemplary embodiment of a load handling clamp with which the present improved control system can be used.

A typical load-handling clamp which can be controlled by the exemplary embodiments of the control system shown herein is indicated generally as 10 in FIG. 1. The exemplary clamp 10 is preferably a slidable-arm clamp having a frame 11 adapted for mounting on a lift truck carriage which can be selectively reciprocated vertically along a conventional load lifting mast (not shown). The particular exemplary clamp 10 in FIG. 1 is for clamping and lifting rectilinear loads, such as cartons or packages 12, singly or in various different stacked and/or side-by-side multiples or configurations. Clamp arms 14, 16 are slidable selectively away from or toward one another to open or close the load engaging surfaces 20, 22 relative to the loads. Hydraulic cylinders 26, 28 preferably selectively extend or retract the respective clamp arms 14, 16. Alternatively, the clamp arms could be extended or retracted by other types of hydraulically or electrically powered linear or rotary motors, rather than hydraulic cylinders.

As a further exemplary alternative, the clamp 10 could be a slidable or pivoted-arm clamp having either hydraulically or electrically actuated curved load engaging surfaces for grasping the curved sides of paper rolls or other non-rectilinear loads.

Figure 2:
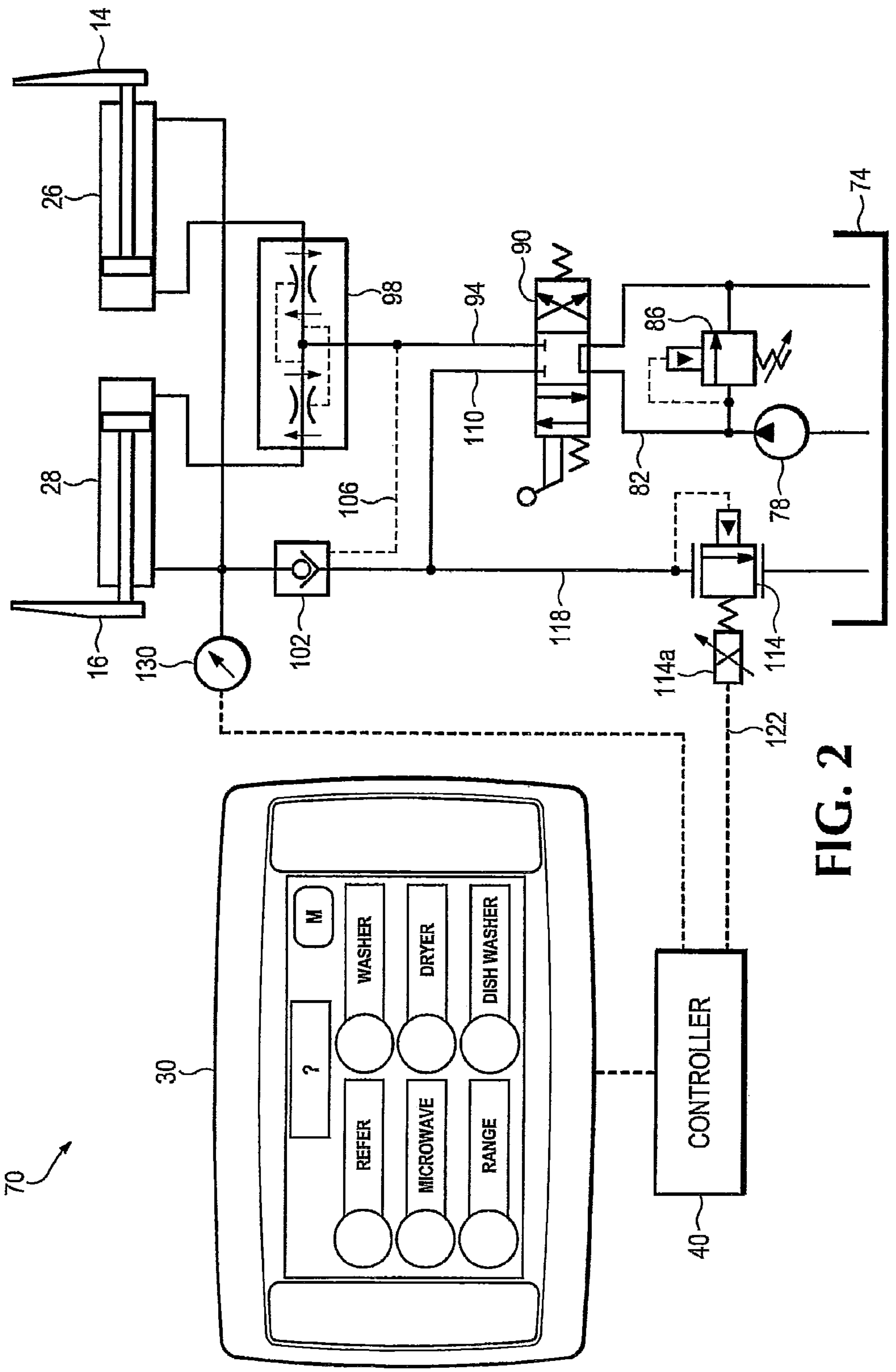
FIGS. 2 and 2A are exemplary electro-hydraulic system diagrams illustrating alternative embodiments of an exemplary control system.

FIG. 2 shows an exemplary system usable by the operator of a lift truck or other vehicle upon which the load handling clamp of FIG. 1 is mountable. An operator display and input terminal 30, preferably but not necessarily of a touch screen, voice, and/or eye movement/gaze tracking type for selection and system input purposes, is connected to a microprocessor-based controller 40 having a memory containing information with respect to different optimal maximum (and/or minimum) clamping force settings with which the clamp 10 should engage different loads. These clamping force settings are correlated, preferably through lookup tables, with various load types and load geometric configurations expected to be encountered by the clamp operator in his particular load handling operation. The various optimal clamping force settings may be expressed in any form representative of the clamping force, such as by hydraulic clamping pressure. The optimal clamping force setting for each different combination of load type and load geometric configuration will have normally been derived from any of several different sources, such as from previous experience in the particular load handling operation and/or from packaging design calculations, and will have been entered into the controller's memory to customize it for the intended load handling operation. The controller can preferably receive, process and output all of the foregoing information, and any updates thereof, independently of the load handling facility's central computerized information management system.

Further referring to the exemplary system of FIG. 2, hydraulic clamping cylinders 26, 28 are preferably controlled through hydraulic circuitry, indicated generally as 70. The hydraulic clamping cylinders 26, 28 receive pressurized hydraulic fluid from the lift truck's reservoir 74 through a pump 78 and supply conduit 82. Safety relief valve 86 opens to shunt fluid back to the reservoir 74 if excessive pressure develops in the system. The flow in conduit 82 supplies clamp control valve 90, and preferably also other valves such as those controlling lift, tilt, side shift, etc. (not shown). The clamp control valve 90 may be manually controlled selectively by the operator to cause the cylinders 26, 28 either to open the clamp arms 14, 16 or to close the clamp arms into contact with the load 12. Alternatively, the valve 90 could be solenoid-operated and controlled electrically by the controller 40.

To open the clamp arms 14, 16, the schematically illustrated spool of the valve 90 is moved to the left in FIG. 2 so that the pressurized fluid from line 82 is conducted through line 94 and flow divider/combiner 98 to the piston ends of cylinders 26, 28, thereby extending the cylinders at a substantially equal rate due to the equal flow-delivering operation of the divider/combiner 98 and moving the clamp arms 14, 16 away from each other. Pilot operated check valve 102 is opened by the clamp-opening pressure in line 94 communicated through pilot line 106, enabling fluid to be exhausted from the rod ends of cylinders 26, 28 through line 110 and valve 90 to the reservoir 74 as the cylinders 26, 28 extend.

Figure 2A:
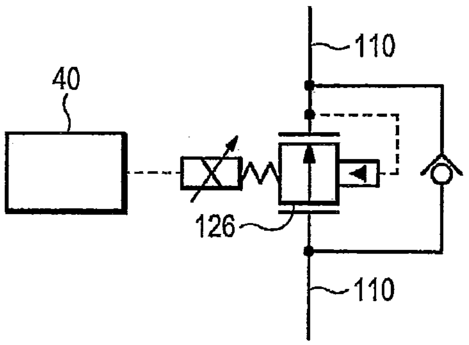

Alternatively, to close the clamp arms and clamp the load 12, the spool of the valve 90 is moved to the right in FIG. 2 so that pressurized fluid from line 82 is conducted through line 110 to the rod ends of cylinders 26, 28, thereby retracting the cylinders and moving the clamp arms 14, 16 toward each other. Fluid is exhausted at substantially equal rates from the piston ends of the cylinders 26, 28 through the flow divider/combiner 98, and then through line 94 and valve 90 to the reservoir 74. During closure of the clamp arms 14, 16 by retraction of the cylinders 26, 28, an optimal maximum hydraulic closing pressure in the line 110 is preferably controlled by one or more pressure regulation valves. For example, such a pressure regulating valve can be a proportional relief valve 114 in line 118 parallel with line 110, which provides different optimal maximum clamping force settings controlled in a substantially infinitely variable manner by controller 40 via an electrically conductive line 122 which variably controls a proportional solenoid 114*a* of the relief valve 114. Alternatively, a proportional pressure reducing valve 126 (FIG. 2A) could be interposed in series in line 110 to similarly regulate the optimal maximum hydraulic closing pressure in line 110. As further alternatives, multiple non-proportional pressure relief or pressure reducing valves connected in parallel could be variably selectable for this purpose. If desired, the controller 40 could also optionally receive feedback of the clamp force from hydraulic closing pressure as detected for example by an optional pressure sensor 130 located upstream or downstream of check valves 102, to aid its control of any of the foregoing pressure regulation valves. Such optional feedback could be provided alternatively from a clamp arm-mounted electrical stress transducer (not shown), or other sensor(s) located at various places in the hydraulic system 70.

The numerous possible variables stemming from the type and geometric configuration of each load to be handled usually require an empirical, qualitative determination of the optimal clamping force setting for a particular load. These possible variables may include, for example, the weight, size, strength, fragility and deformability of the load, and/or the strength, fragility and deformability of its packaging. Such complex variables create a basic unpredictability in the optimal clamping forces required in the lifting of any particular clamped load. The present system provides such determinations, together with their matching load type and geometric configuration information, by means of lookup tables in the controller, which may either be customized for a particular load handling operation or selectable by each different load handling operation for its particular needs. FIGS. 3-6 depict an exemplary type of operator display and input terminal which translates the complicated load type and geometric configuration variables into displays easily recognizable and understandable visually by a clamp operator, and preferably but not necessarily comparable visually by the operator with a particular load which he is about to engage, so that he can input information representative of these variables into the controller 40 to interactively guide it in its selection of an optimal clamping force setting for the particular load.

Figure 3:
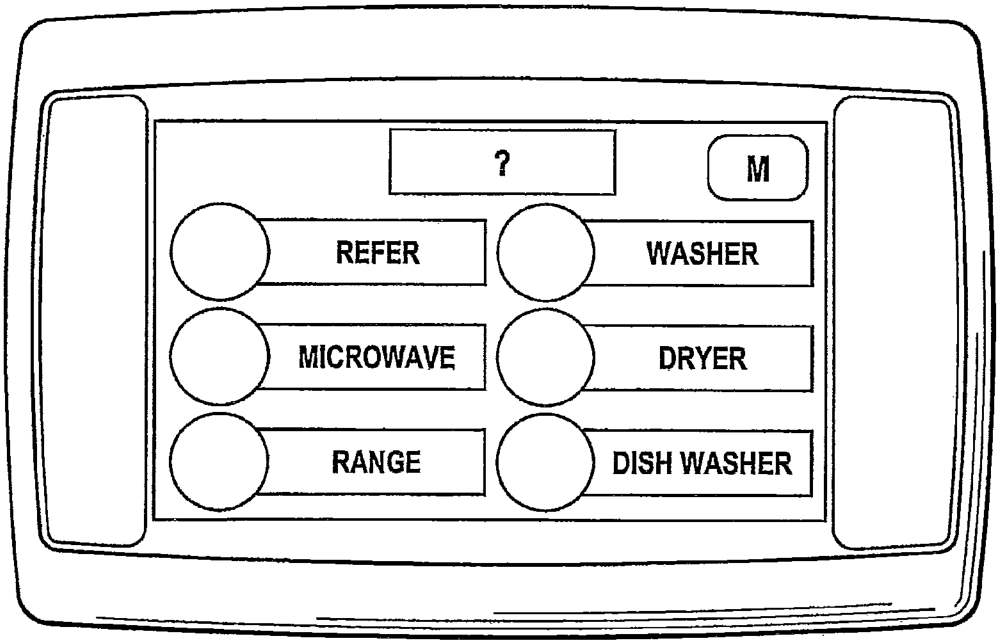
FIGS. 3-6 show an exemplary operator terminal with an exemplary sequence of displays for enabling an operator to select and input the load type and geometric configuration of a particular load which the operator is about to engage with a load handling clamp, and for enabling the system of FIGS. 2 and 2A to determine and set an optimal clamping force.
Figure 4:
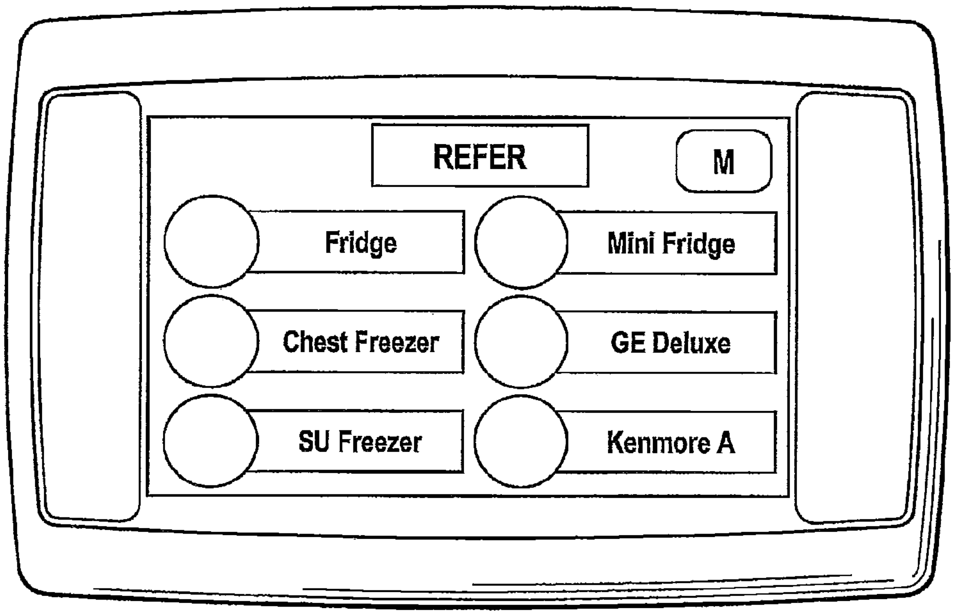

The exemplary display of FIG. 3 is for a clamp operator working in a load handling facility containing kitchen and laundry room electrical household appliances. (If other different broad types of loads were also expected to be handled in the same facility, the screen of FIG. 3 might be preceded by a similar screen listing those other broad types, from which the operator could select the type corresponding to FIG. 3.) The exemplary screen of FIG. 3 lists six different broad types of such household appliances so that the operator can compare such types visually to the particular load which he is about to engage. If the operator is looking at a refrigeration appliance load, for example, he would then touch the button for "REFER," and the exemplary screen would change to a form such as shown in FIG. 4 where the operator's previous "REFER" choice is displayed at the top, together with six possible narrower types of refrigeration appliances listed below. Then, if the operator is looking at a load of one or more "GE DELUXE" type refrigerators the operator would touch the "GE DELUXE" type and thereby change the screen again to a format such as shown in FIG. 5.

Figure 5:
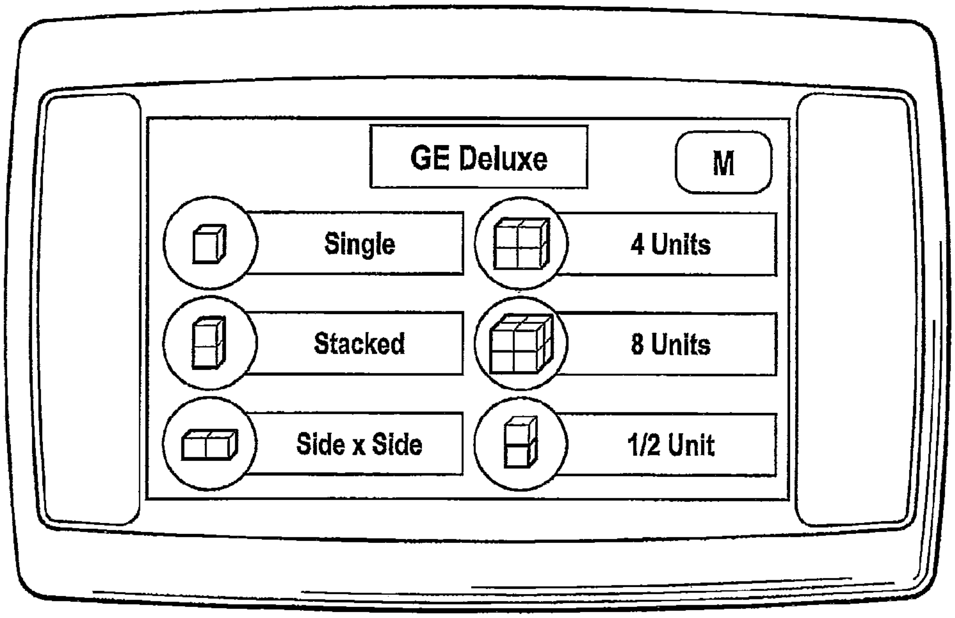
Figure 6:
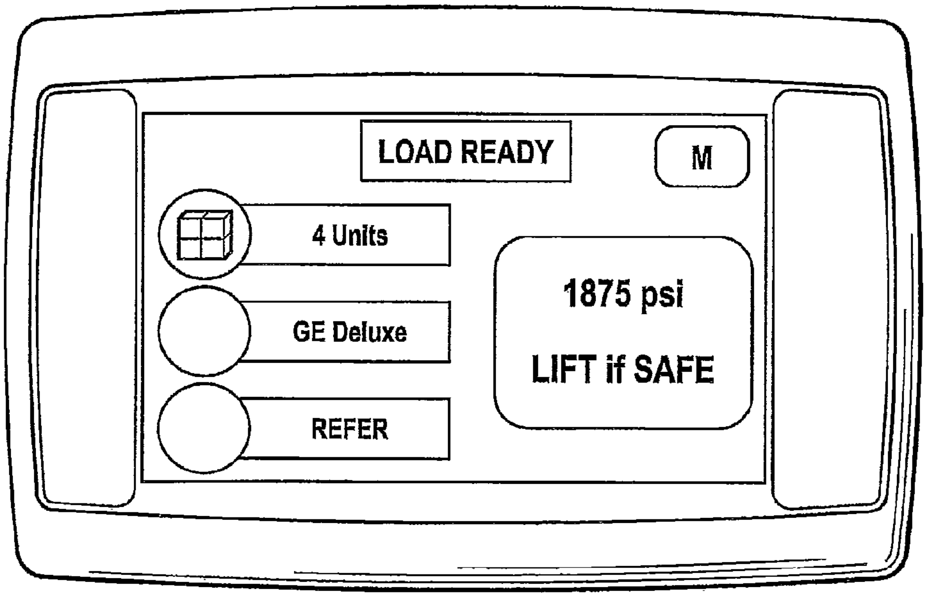

FIG. 5 suggests six different possible load geometric configurations for the "GE DELUXE" type listed at the top of the screen. If the operator's visual observation of the intended load reveals that there are four such "GE DELUXE" items stacked together in side-by-side groups of two, this would prompt him to press the "FOUR UNITS" button on the screen of FIG. 5 because this selection displays a visual diagram of such a side-by-side stacking arrangement. This selection then changes the screen to the format shown in FIG. 6 displaying the "FOUR UNITS" choice, while also indicating "LOAD READY" at the top, and the desired predetermined maximum optimal clamping force setting of "1875 PSI" which the controller 40 has selected from its lookup tables matching both the particular load type and geometric configuration in combination.

The "Load Ready" display indicates to the operator that the clamping system of FIG. 2 is ready to close the clamp arms into engagement with the load. Accordingly the operator may manually move the clamp control valve 90 to its clamp-closing position, assuming that the operator has first observed visually, or been notified by an optional clamp arm position sensor (not shown), that the clamp arms are in a wide enough open position to engage the load.

As the clamp arms engage the load, the clamping force will increase to the point where the hydraulic clamping pressure, as sensed by optional pressure sensor 130 in FIG. 2, reaches the optimal maximum clamping pressure previously determined by the controller 40 corresponding to the optimal clamping force setting. This preferably causes the controller 40 to display on the screen of FIG. 6 a background color surrounding the "1875 PSI" display, together with the words "LIFT IF SAFE." This indicates to the operator that the optimal clamping force has been achieved, and that the load may therefore be lifted by the operator if all other conditions are safe.

During the subsequent handling of the load, the optional pressure sensor 130 could also continue to monitor the actual hydraulic clamping pressure and send an audible and/or visual warning signal to the operator's terminal 30 via the controller 40 if the sensed pressure departs from the setting corresponding to the optimal clamping force. The warning signal could be sent in any of various ways, such as by a change or removal of the colored background surrounding the "1875 PSI" display, and/or the display of the actual sensed pressure alongside the intended optimal pressure. In such case the operator could activate the clamp control valve 90 to correct the pressure discrepancy.

Figure 7:
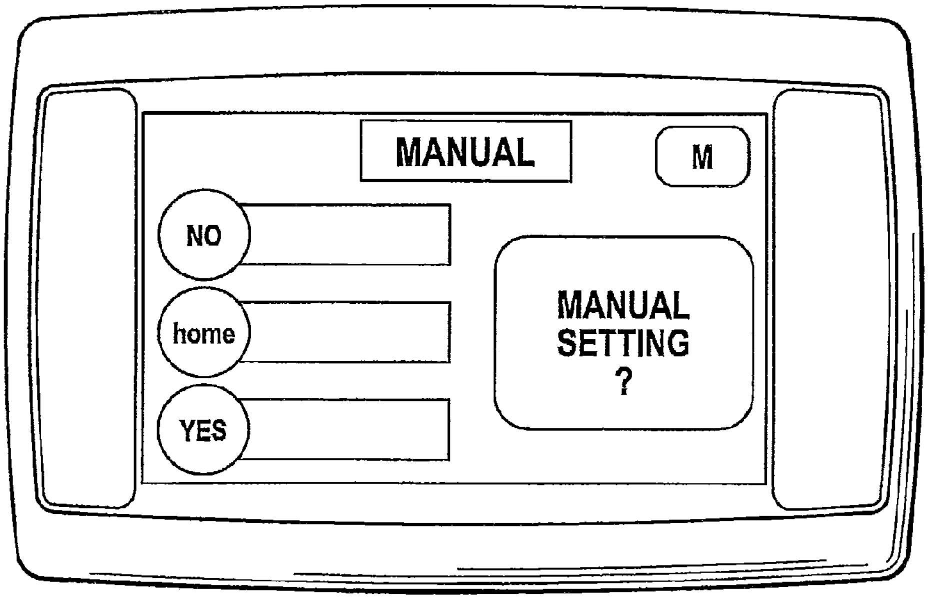
FIGS. 7-9 show a further exemplary sequence of displays enabling an operator to select a particular clamping force setting when such a setting cannot be determined using the displays of FIGS. 3-6.
Figure 8:
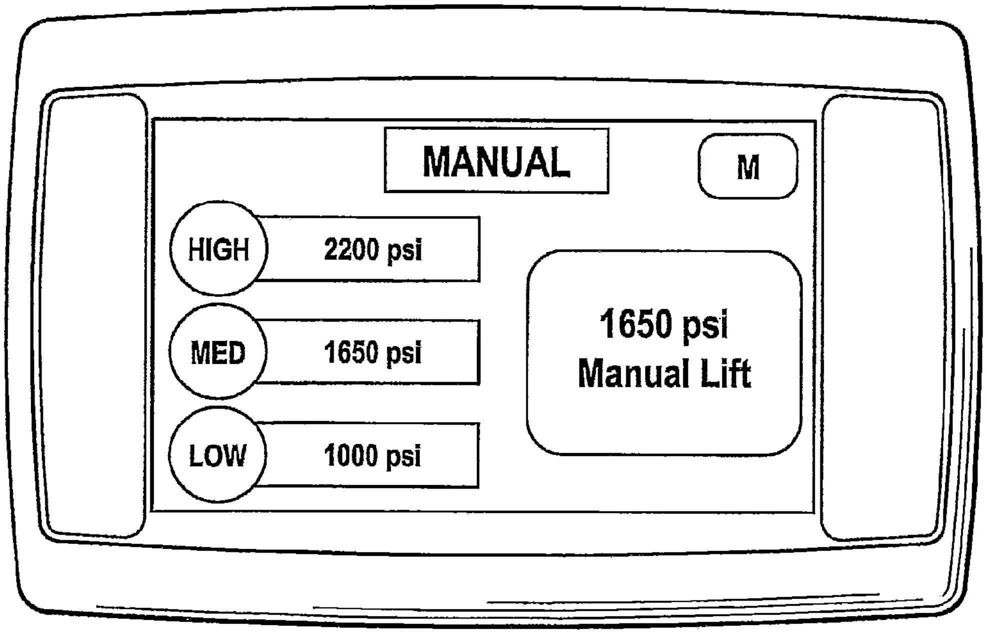
Figure 9:
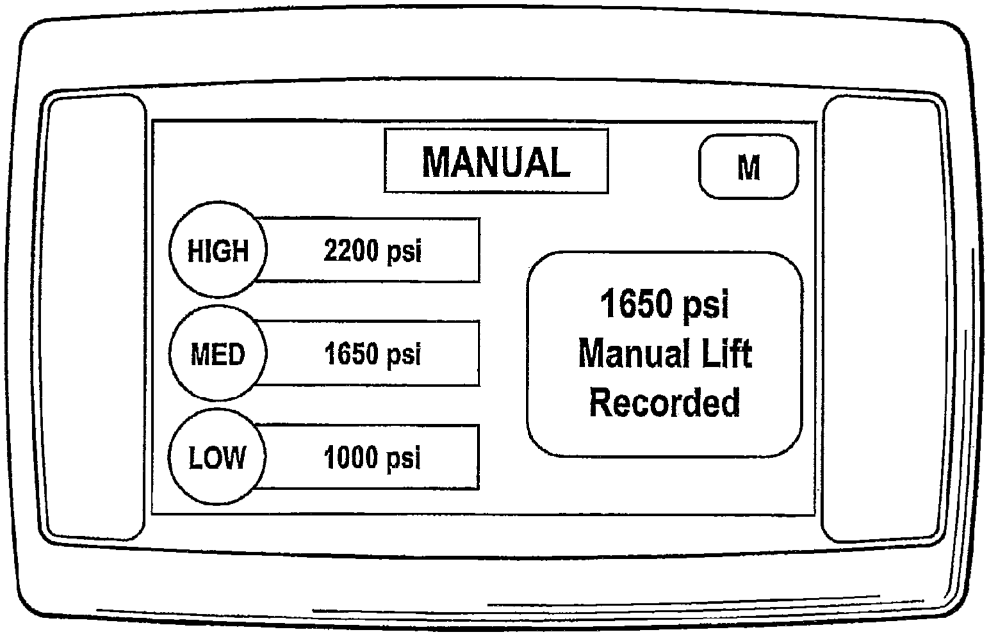

The controller 40 might in some cases, for example because of inadequate stored information, be unable to select an optimal clamping force pressure setting for a particular load using the foregoing displays of FIGS. 3-6. In such case the operator could use an optional alternative procedure. For example, by pushing the "M" button rapidly twice, the operator could access a "MANUAL" screen such as shown in FIG. 7 and then, by pressing the "M" button again to verify his intention to enter the "MANUAL" mode of operation, acquire the screen of FIG. 8. Then the operator could select one of the three suggested predetermined maximum hydraulic clamping pressures shown in FIG. 8, which would cause the selected pressure, such as "1650 PSI," to be displayed as in FIG. 8. By pressing the "M" button again, a respective distinctive background color corresponding to the selected pressure could appear in FIG. 9 surrounding the selected pressure, indicating that the operator may actuate the clamping valve 90 to close the clamp as described above. Optionally, when the hydraulic clamping pressure achieves the intended pressure as sensed by the pressure sensor 130, the word "RECORDED" could appear on the screen as shown in FIG. 9. Thereafter, any further discrepancies from the intended pressure, as sensed by the optional pressure sensor 130, could be brought to the operator's attention and corrected in the same manner described previously.

Preferably, the controller 40 could optionally also include a data recorder function for recording and reporting useful information regarding driver identification, times, dates, operator inputs, intended clamping pressures and/or achieved clamping pressures, for particular operator uses or attempted uses of the control system such as, for example, those which may not result in the system's successful selection of an optimal clamping force, or which may involve the "MANUAL" mode of operation, or which may fail to achieve or maintain an optimal clamping force, etc.

Large paper rolls can serve as an alternative example of completely different types of loads to be clamped by the present system. Initially, for example, different types of paper rolls in a particular load handling facility could be categorized according to their visually discernible different paper types such as kraft paper, corrugated paper, newsprint, bond paper, etc. and listed on an initial screen comparable to FIG. 3. Then different visually discernible diameter types of the rolls, such as 30-inch, 45-inch or 60-inch, could be listed on a screen comparable to FIG. 4. Then different possible geometric load configurations of one or more rolls to be clamped could be listed on a screen comparable to FIG. 5, with the system otherwise functioning as described above.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

We claim:

1. A control system comprising:

(a) a controller for a load-handling clamp having first and second load-engaging surfaces for selectively gripping respective dissimilar loads between said surfaces, at least one of said surfaces being selectively movable toward the other by a clamping actuator;

(b) said controller being capable of variably regulating a clamping force setting causing said actuator to move said one of said surfaces toward the other in a load gripping movement;

(c) said controller being operable to receive information selected by an operator of said load handling clamp, said information describing both a respective load type and a respective load geometric configuration variably applicable to a particular one of said dissimilar loads; and (d) said controller being operable to variably identify a particular predetermined optimal clamping force setting applicable to said particular one of said dissimilar loads, automatically depending upon both said respective load type and said respective load geometric configuration in combination as selected by said operator.

2. The control system of claim 1 wherein said controller includes a data storage unit capable of storing different respective predetermined optimal clamping force settings in correspondence with different combinations of respective load types and respective load geometric configurations selected by said operator.

3. The control system of claim 1 wherein said controller is operably connectable to a display terminal through which said controller can display respective load types and respective load geometric configurations in a form discernible visually by said operator, so as to be visually comparable by said operator with said particular one of said dissimilar loads.

4. The control system of claim 1 wherein said controller is operable to control said clamping actuator to achieve said optimal clamping force.

5. The control system of claim 1 wherein said controller is operable to control said clamping actuator to achieve an alternative clamping force setting if said controller is unable to determine any optimal clamping force setting.

6. The control system of claim 1 wherein said controller is operably connectable to an information input terminal to enable said operator to manually select said information.

7. The control system of claim 6 wherein said information input terminal is operable to display respective load types and respective load geometric configurations from which said operator can select said information entered by said operator.

8. The control system of claim 1 wherein said controller includes a data recorder for recording and reporting at least one type of data chosen from (a) said information entered by said operator, (b) optimal clamping force settings, (c) clamping force settings alternative to said optimal clamping force settings, and (d) achieved clamping forces.

9. The control system of claim 6 wherein said information input terminal is operable to display said optimal clamping force setting determined by said controller.

10. The control system of claim 9 wherein said information input terminal is operable to display said optimal clamping force setting as an optimal hydraulic clamping pressure value.

11. The control system of claim 6 wherein said information input terminal is operable to display an indication of whether or not said optimal clamping force setting is achieved.

* * * * *